(No Model.)
B. A. MULLIN.
DUMPING SCOW.
No. 501,020. Patented July 4, 1893.
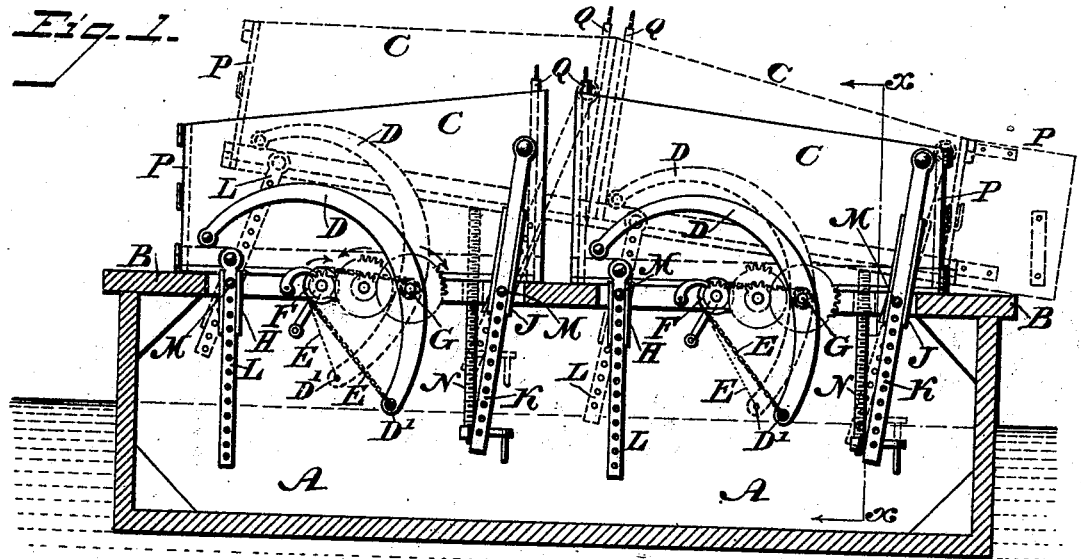
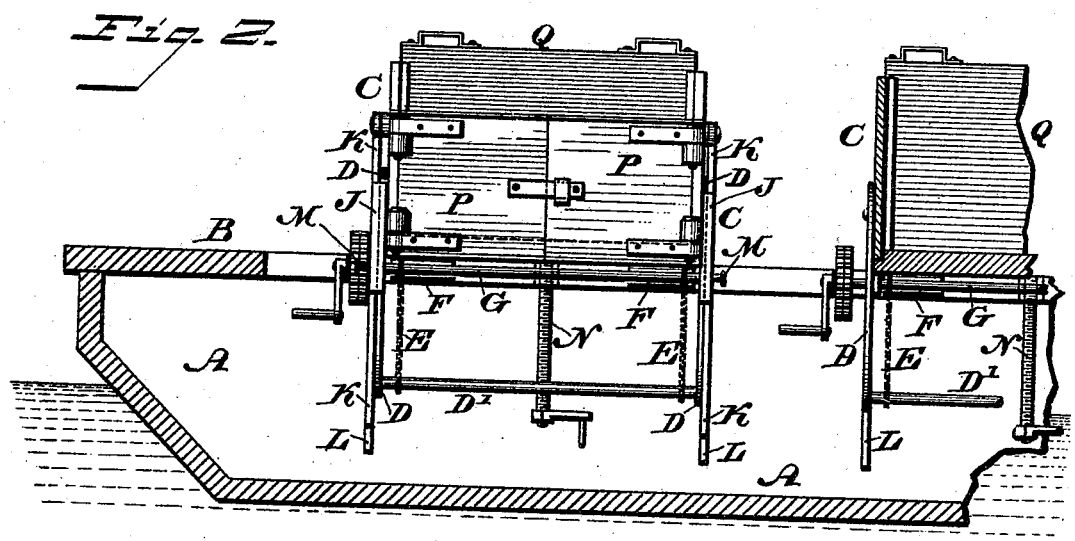
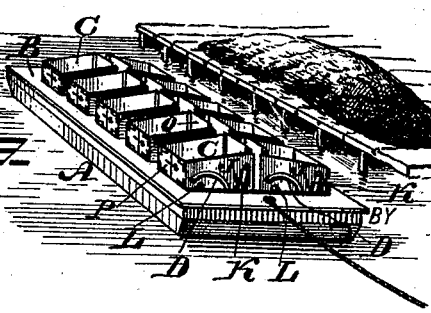
WITNESSES:
L. Douville
O. F. Eagles
INVENTOR
Bernard A. Mullin
BY John A. Wiedersheim
ATTORNEY.

UNITED STATES PATENT OFFICE.

BERNARD A. MULLIN, OF PHILADELPHIA, PENNSYLVANIA, ASSIGNOR TO ADOLPH SEGAL AND HERMAN HOOPES, OF SAME PLACE, AND THE MULLIN DREDGING AND LIGHTERING COMPANY, OF NEW JERSEY.

DUMPING-SCOW.

SPECIFICATION forming part of Letters Patent No. 501,020, dated July 4, 1893.

Application filed June 15, 1892. Serial No. 436,878. (No model.)

*To all whom it may concern:*

Be it known that I, BERNARD A. MULLIN, a citizen of the United States, residing in the city and county of Philadelphia, State of Pennsylvania, have invented a new and useful Improvement in Dumping-Scows, which improvement is fully set forth in the following specification and accompanying drawings.

My invention consists in providing a dumping scow with a body to receive dirt, dredgings, &c., the same being adapted to be tilted, whereby the contents of the body may be dumped upon the land or a wharf when so required.

It also consists in providing the scow with tilting bodies which may be placed in communication with each other when so required.

Figure 1 represents a transverse section of a dumping scow embodying my invention. Fig. 2 represents a partial longitudinal section of the scow shown in Fig. 1. Fig. 3 represents a perspective view of the scow with numerous bodies thereon, on a reduced scale, and of an adjacent wharf showing dredgings, &c., dumped thereon.

Similar letters of reference indicate corresponding parts in the several figures.

Referring to the drawings:—A designates a scow or boat on the floor B of which are placed the bodies C, to whose sides near the end thereof are pivoted the arms D, whose lower ends are connected by cross bars D', around which pass the ropes or chains E, which are guided on pulleys F, and secured to shafts G on which the arms D are mounted, and which shafts by means of gearing and suitable crank handles may be rotated in order to wind the chains thereon, and thus raise the pivoted ends of the arms D, and consequently of the relative ends of the bodies C. The floor of the scow is provided with openings for said gearing and the walls of the same form the bearings for the shafts of the gearing, the pulleys F, and the shafts G.

Pivoted to the walls of the openings in the floor B, are guides H and J, in which are freely fitted the tilting bars K and L, whose upper ends are pivoted to the opposite ends of the bodies C, said guides and bars having openings therein to receive pins M, whereby said bars may be held in their adjusted elevated positions Passing through the floor of the scow are screws N, which bear against the ends of the bodies C in order to raise said ends. The outer ends of the bodies are provided with hinged or other doors P, and the inner ends with sliding gates Q, the former when opened, permitting the discharge of the contents of the bodies, and the latter when raised or removed permitting two adjacent bodies which are located end to end, as seen in Figs. 1 and 3, to be placed into communication for purposes to be hereinafter explained.

The operation is as follows:—The dredging, &c., is placed in the bodies C, and the scow conveyed to the desired place of dumping or discharge. The crank handles of the gearing are then turned, whereby the arms D turn on the axes, and the ends of the bodies with which said arms are connected are raised, the arms L following the motion of the bodies. When the desired height is obtained, pins are passed through the openings in said arms, and the guides H thereof. The screws N are then operated, whereby the contiguous ends of the bodies are also raised. The arms K rise with said ends, and when at the proper height, they are held by pins inserted in the same through the guides J. The doors P may now be opened, and as the bodies are at an inclination, the loads may be readily dumped or discharged upon a wharf, the land, &c.

It will be observed that the bodies on either the right or left side of the scow have been operated relatively to the side of the scow where the loads have to be dumped or discharged. Now it is essential to discharge the contents of the bodies on the other side of the scow. For this purpose, these bodies are raised similarly to that hereinbefore stated, excepting to a greater extent, so that the inner ends of the bodies approach and close against each other as continuities, as shown in dotted lines Fig. 1. The gates or tailboards Q are now raised or removed, thus placing the contiguous bodies in communication, whereby their loads may be dumped or discharged from one through or over the other. The doors and gates may now be restored or closed, and the pins of the arms K and L withdrawn, when the bodies lower or are permitted to lower, and so resume their normal positions, when the scow may be conveyed elsewhere, for fresh loads of material. It is evident that the scow may be substituted by a truck or other carriage where it is designed to convey the dumping apparatus on land instead of water.

Having thus described my invention, what I claim as new, and desire to secure by Letters Patent, is—

1. A scow having a dumping body thereon, arms pivoted to said body and mounted on the scow, chains connected with said arms and with a shaft mounted on the scow, gearing for said shaft also mounted on the scow, bars pivotally connected with the opposite ends of the body and fitted in pivotal guides on the scow, and a screw mounted in the floor of the scow below the body, and adapted to bear against and raise the end of the latter opposite to the connection of the aforesaid arms.

2. A scow provided with two rows of dumping bodies independent mechanism for raising and lowering each end of said dumping bodies, said bodies having gates or doors in each end, and said rows being so arranged that adjacent bodies of the different rows may be connected when raised, said parts being combined substantially as described.

3. A scow having a dumping body thereon, a shaft and gearing mounted on the scow for operating said shaft, a chain connected with said shaft and with an arm pivoted to one end of the body, rising and falling bars pivoted to opposite ends of the body, pivotal guides mounted on the scow receiving said bars, and a screw mounted on the scow and bearing upwardly against the body at the end opposite to the connection of the said pivoted arm, substantially as described.

BERNARD A. MULLIN.

Witnesses:
JOHN A. WIEDERSHEIM,
A. P. JENNINGS.